United States Patent [19]

Miyamoto et al.

[11] Patent Number: 5,555,467
[45] Date of Patent: Sep. 10, 1996

[54] CAMERA EQUIPPED WITH DATA IMPRINTING DEVICE

[75] Inventors: Hidenori Miyamoto; Isao Soshi; Hiroshi Wakabayashi, all of Tokyo, Japan

[73] Assignee: Nikon Corporation, Tokyo, Japan

[21] Appl. No.: 472,471

[22] Filed: Jun. 7, 1995

Related U.S. Application Data

[62] Division of Ser. No. 67,676, May 26, 1993, Pat. No. 5,473,397.

[30] Foreign Application Priority Data

May 26, 1992 [JP] Japan ................................ 4-133490

[51] Int. Cl.$^6$ ........................................ G03B 17/24
[52] U.S. Cl. ............................. 354/106; 354/159
[58] Field of Search .............................. 354/105, 106, 354/159

[56] References Cited

U.S. PATENT DOCUMENTS

| | | | |
|---|---|---|---|
| 4,265,526 | 5/1981 | Ueda et al. | 354/106 |
| 4,994,830 | 2/1991 | Harvey | 354/106 |
| 5,057,857 | 10/1991 | Hata et al. | 354/106 |
| 5,128,702 | 7/1992 | Ogawa et al. | 354/106 |
| 5,245,373 | 9/1993 | Ogawa et al. | 354/106 |
| 5,389,991 | 2/1995 | Naka et al. | 354/159 |
| 5,398,088 | 3/1995 | Yamazaki et al. | 354/106 |

*Primary Examiner*—David M. Gray

*Attorney, Agent, or Firm*—Christopher R. Pastel; Thomas R. Morrison

[57] ABSTRACT

A camera with a data imprinting device has a plurality of in-line LEDs producing light focused by an optical system upon a photographic film at a first and a second position, corresponding to a full size format and a panorama size format, respectively. The focused light imprints data images upon the film at the first position are larger than data images imprinted at the second position. The optical system has first and second prisms, with integrated lenses, for reflecting and focusing the light upon the film at the first and second positions, respectively. A shutter plate is selectively positioned over apertures through which the light is focused, thus blocking the light and allowing only a selected imprint to be made upon the film. A vertical pattern of the data image is created by a controller selectively illuminating the in-line LEDs while a horizontal pattern is produced by the controller illuminating the LEDs in coordination with the movement of the film past the apertures. The controller actuates a motor for advancing the film and has a sensor for detecting film travel. A first embodiment has the first prism positioned further from the film than the second prism, which is positioned further from the LEDs than the first prism, such that reflected light from the first prism has a path intersecting that of incident light of the second prism. A second embodiment has the prisms offset from each other in the plane of the film such that light paths do not intersect. The first embodiment has a narrower width than the second embodiment while the second embodiment has a shallower depth than the first embodiment.

1 Claim, 12 Drawing Sheets

FIG. 7
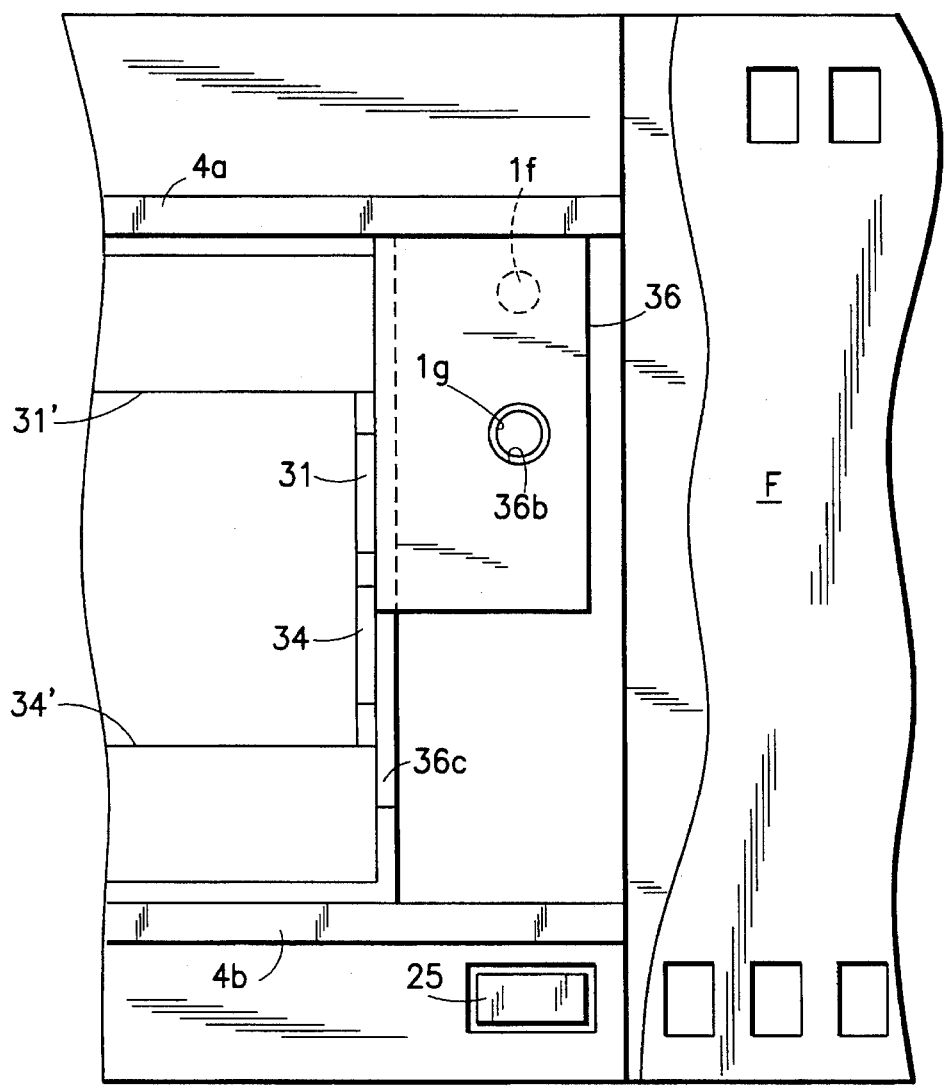
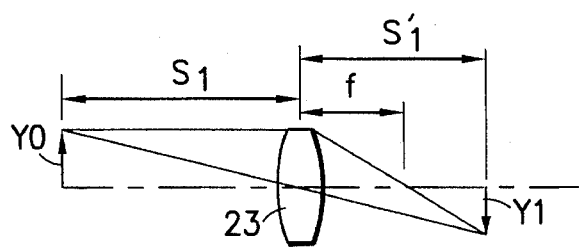
FIG. 8(a)
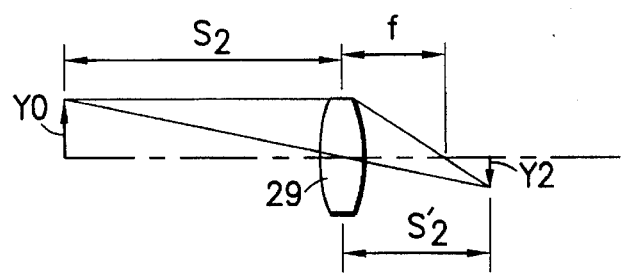
FIG. 8(b)

CAMERA EQUIPPED WITH DATA IMPRINTING DEVICE

This application is a divisional of application Ser. No. 08/067,676, filed May 26, 1993, now U.S. Pat. No. 5,473,397.

BACKGROUND OF THE INVENTION

This invention relates to a camera having an internal data imprinting device. More particularly, the invention involves a camera capable of taking pictures in both a full size format and a panorama size format wherein each format has a distinct data size and data position upon a film.

Embodiments of cameras having data imprinting devices have employed fixed position systems wherein a size of a data image remained constant regardless of a format mode selected. In such systems the light path is fixed, for example, at a lower part of the film with the characters being imprinted in a center of a frame. Since the position of the data remained constant, data could not be imprinted within a framed area of a panorama size format picture.

Another embodiment of a camera with a data imprinting device, as disclosed in Japanese Laid-open Patent Publication No. 63-27823, employs an optical system having movable elements. The data imprinting device disclosed in this publication comprises a plurality of optical elements capable of moving to appropriate positions dependent upon a selected format. A first optical element is disposed at a first position in order to produce characters having full size format dimensions. A second optical element, preferably with a different enlargement, moves from a first position to a second position in order to imprint panorama size format data images which are smaller than those of the full size format. Thus, the two optical elements provide appropriate character sizes respectively. However, movement of the first and second optical elements necessitates increased system complexity and is prone to produce blurred data images due to inaccuracies in the positioning of the optical elements.

OBJECTS AND SUMMARY OF THE INVENTION

It is an object of this invention to provide a camera equipped with a data imprinting devices which overcomes the drawbacks of the prior art.

It is a general object of the present invention to provide a data imprinting device for imprinting data images at a first position in a full size format, and imprinting smaller data images at a second position in a panorama size format.

It is a further object of the present invention to provide a device permitting the imprinting of data upon a film in a full size and a panorama size format wherein fixed optical components are solely employed.

Still further, it is an object of the invention to provide a device for imprinting data upon a film which permits a width of a camera to be minimized.

Yet another object of the present invention is to provide a data imprinting device, for use in a camera, which permits the depth of a camera to be minimized.

Briefly stated, the present invention provides a camera with a data imprinting device having a plurality of in-line LEDs producing light focused by an optical system upon a photographic film at a first and a second position, corresponding to a full size format and a panorama size format, respectively. The focused light imprints data images upon the film at the first position which are larger than data images imprinted at the second position. The optical system has first and second prisms, with integrated lenses, for reflecting and focusing the light upon the film at the first and second positions, respectively. A shutter plate is selectively positioned over apertures through which the light is focused, thus blocking the light and allowing only a selected imprint to be made upon the film. A vertical pattern of the data image is created by a controller selectively illuminating the in-line LEDs while a horizontal pattern is produced by the controller illuminating the LEDs in coordination with the movement of the film past the apertures. The controller actuates a motor for advancing the film and has a sensor for detecting film travel. A first embodiment has the first prism positioned further from the film than the second prism, which is positioned further from the LEDs than the first prism, such that reflected light from the first prism has a path intersecting that of incident light of the second prism. A second embodiment has the prisms offset from each other in the plane of the film such that light paths do not intersect. The first embodiment has a narrower width than the second embodiment while the second embodiment has a shallower depth than the first embodiment.

According to an embodiment of the invention, there is provided a camera comprising: a camera body, light emitting elements, optical means for focussing light emitted from the plurality of light emitting elements on a surface of a photosensitive means, means for selecting at least one of a first screen size and a second screen size, the optical means having optical elements for creating first and second images corresponding to each screen size, means for occluding the light focussed by the optical means, the means for occluding being responsive to the means for selecting, means for forming imprinted data from the light focussed on the surface of the photosensitive means, and means for exposing the surface of the photosensitive means to light from an object to be photographed.

Furthermore, according to an embodiment of the present invention, there is provided a data imprinting device for use in a camera comprising: illumination means for emitting imprinting light, optical means for focusing the imprinting light upon a photosensitive surface at at least two positions, means for selectively blocking the imprinting light from focusing upon at least one position of the at least two positions, and control means for coordinating the illumination means with a movement of the photosensitive surface such that the imprinting light produces images upon the photosensitive surface.

According to a feature of an embodiment of the present invention there is provided an optical means for focussing including crossing light paths permitting the optical elements to be in-line in a plane perpendicular to the surface.

Still further, an embodiment of the present invention provides a data imprinting device for use in a camera comprising: illumination means for emitting imprinting light, optical means for focusing the imprinting light upon a photosensitive surface at at least two positions, the optical means including a first reflecting means for reflecting incident light of the imprinting light upon a first position of the at least two positions, the optical means including a second reflecting means for reflecting incident light of the imprinting light upon a second position of the at least two positions, the first position being above the second position, the first reflecting means being set back further from the photosensitive surface than the second reflecting means, means for selectively blocking the imprinting light from focusing upon at least one position of the at least two positions, control means for coordinating the illumination means with a movement of the photosensitive surface, and framing means for selectively shielding an upper and a lower portion of the photosensitive surface from subject image light in coordination with the means for selectively blocking.

Another feature of the present invention provides a device for imprinting data wherein the control means comprises: sensing means for detecting travel of the photosensitive surface past a point of imprinting, advance means for advancing the photosensitive surface, a controller responsive to the sensing means, the controller actuating the advance means, and the controller selectively illuminating the illumination means in response to the sensing means.

Yet another feature of the present invention provides for a data imprinting device wherein the framing means comprises: an upper framing member, pivotally mounted, having a framing portion extending laterally across an upper portion of the photosensitive surface such that the subject image light is selectively obstructed by the framing portion, a lower framing member, pivotally mounted, having a framing portion extending laterally across a lower portion of the photosensitive surface such that the subject image light is selectively obstructed by the framing portion, and the upper and lower framing member having geared portions mutually engaged such that the upper and lower framing members pivot in complementary directions.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 7 is a rear view of the camera body of the first embodiment of the present invention in FIG. 1 illustrating positions of the shutter plate and the framing mechanism in a panorama size mode.

FIGS. 8a and 8b are schematic diagrams showing optical paths in the first embodiment in full and panorama size modes, respectively.

DETAILED DESCRIPTION OF THE INVENTION

Figure 1:
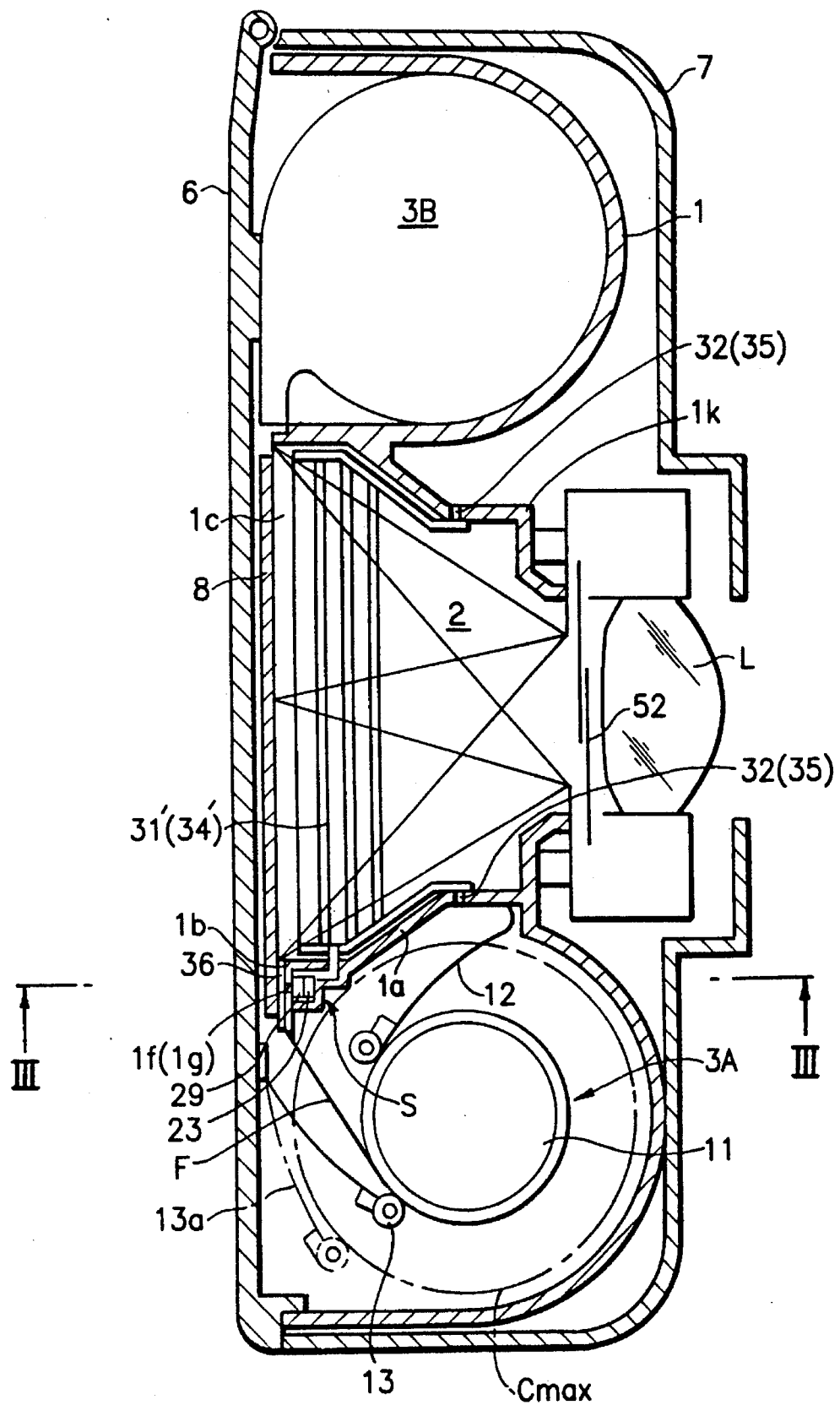
FIG. 1 is a longitudinal cross section of a camera showing a first embodiment of the invention as viewed from the top.

Referring to FIG. 1, there is shown a first embodiment of the present invention having a camera body 1 with a dark chamber 2 integrally formed therein. Light, from an object to be photographed (not shown), is focused by a photographic lens L, through dark chamber 2, onto a surface of a film F when a shutter 52 is opened. An aperture 1c, in a back surface 1b of camera body 1, allows the light to strike a photosensitive surface of film F. Film F is drawn across aperture 1c into a take-up spool chamber 3A by a take-up spool 11, from a feed spool chamber 3B. The feed spool chamber 3B and take-up spool chamber 3A are both integrally formed within camera body 1. A partitioning wall 1a separates take-up spool chamber 3A from dark chamber 2.

Figure 2:
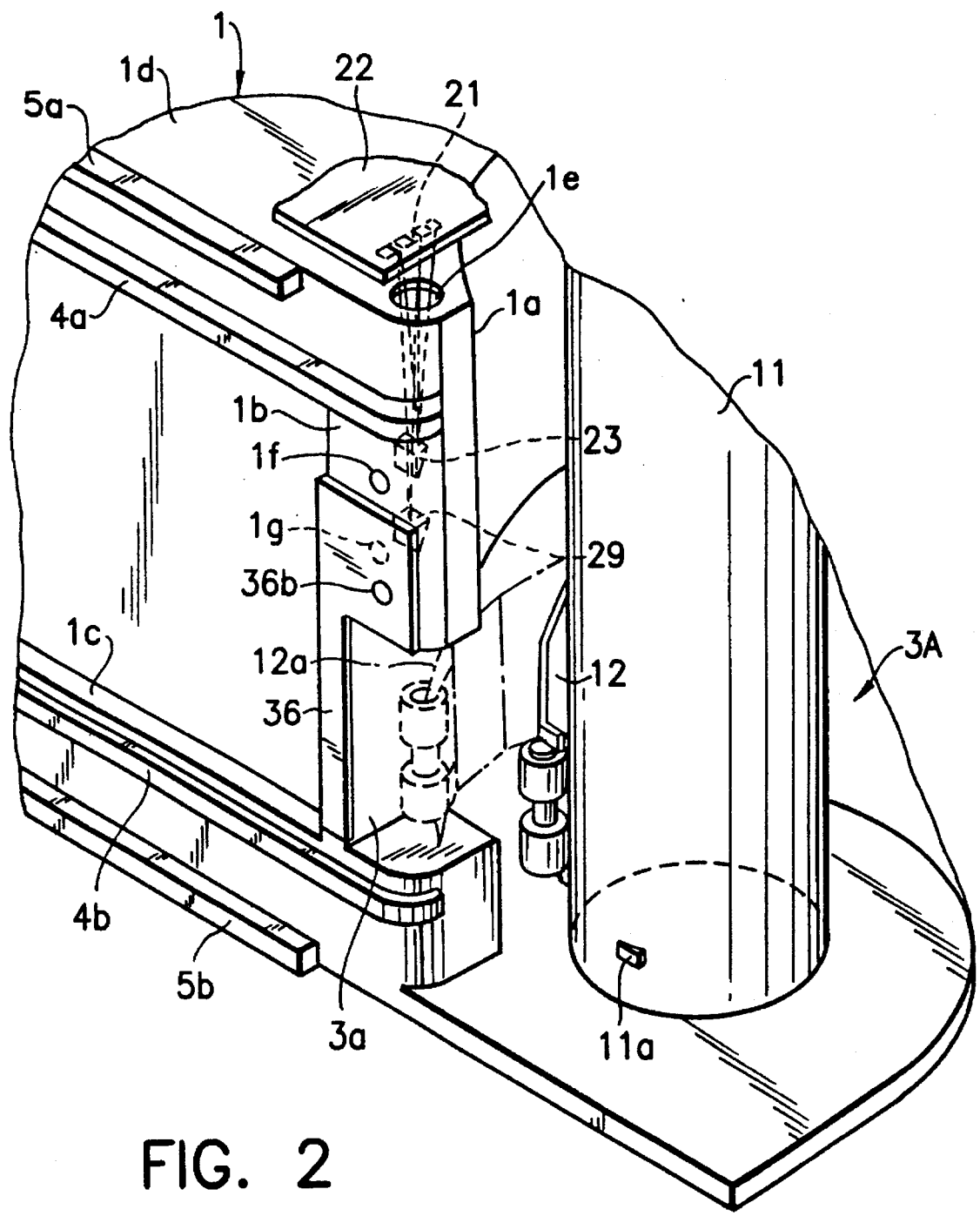
FIG. 2 is a perspective view of a rear portion of a camera body according to the embodiment of the invention in FIG. 1.

Referring to FIG. 2, aperture 1c is flanked, on upper and lower sides, by inner rails 4a and 4b, respectively. Inner rails 4a and 4b protrude into dark chamber 2 from back surface 1b of camera body 1. A pair of outer rails, 5a and 5b, are disposed outside inner rails, 4a and 4b, and protrude from back surface 1b further into dark chamber 2 than inner rails 4a and 4b. Outer rails, 5a and 5b, guide film F (not shown) as it is drawn across aperture 1c. A first pressing roller 12 is biased toward take-up spool 11 by a leaf spring 12a affixed to partitioning wall 1a. A boss 11a, disposed on take-up spool 11, engages a sprocket perforation in film F (not shown) and winds film F around take-up spool 11 as take-up spool 11 is rotated in a counterclockwise direction.

Referring back to FIG. 1, a back cover 6 encloses a rear of camera body 1, and a front cover 7 encloses a front of camera body 1. A pressure plate 8, disposed on an inside surface of back cover 6, biases film F into contact with inner rails 4a and 4b shown in FIG. 2. A second pressing roller 13 is biased toward take-up spool 11 by a leaf spring 13a affixed to back cover 6. Pressure imposed by first and second pressing rollers, 12 and 13, upon film F ensures tight winding of film F on take-up spool 11.

A circle Cmax, shown by a double dash line, indicates the maximum diameter of film F wound on take-up spool 11. When the diameter of film F is at or near maximum circle Cmax, roller 12 is urged into a position, shown by a two-dots-dash line into a recess 3a in partitioning wall 1a. Roller 13 is similarly urged outward to a position shown by a two-dots-dash line.

Referring again to FIG. 2, a data imprinting device includes a plurality of light emitting elements 21, preferably light emitting diodes (LEDs), disposed in a line on a substrate 22 in a direction perpendicular to the photosensitive surface of film F. Substrate 22 is mounted on a top surface 1d of camera body 1 such that emitted light from light emitting elements 21 passes through an aperture 1e in top surface 1d of camera body 1. A driver circuit (not illustrated), for light emitting elements 21, is also disposed on substrate 22.

An optical system including first and second prisms 23 and 29, is disposed in a substantially triangular space S (indicated in FIG. 1) defined by back surface 1b of camera body 1. The prisms, 23 and 29 reflect the emitted light 90 degrees such that reflected light passes through apertures 1f and 1g, respectively, thereby imprinting data upon the photosensitive surface of film F (not shown). A shutter plate 36, having an aperture 36b, is disposed at a rear side of camera body 1. The shutter plate 36 is shown in a first position, used for a full size exposure, wherein aperture 1f is unobstructed, permitting the emitted light to pass therethrough and expose film F (not shown) while aperture 1g is obstructed. Alternatively, shutter plate 36 may be moved upward into a second position such that aperture 1f is obstructed and aperture 1g is aligned with aperture 36b, permitting the emitted light to pass therethrough and expose film F. The second position allows imprinting of film F in a panorama size format.

Figure 3:
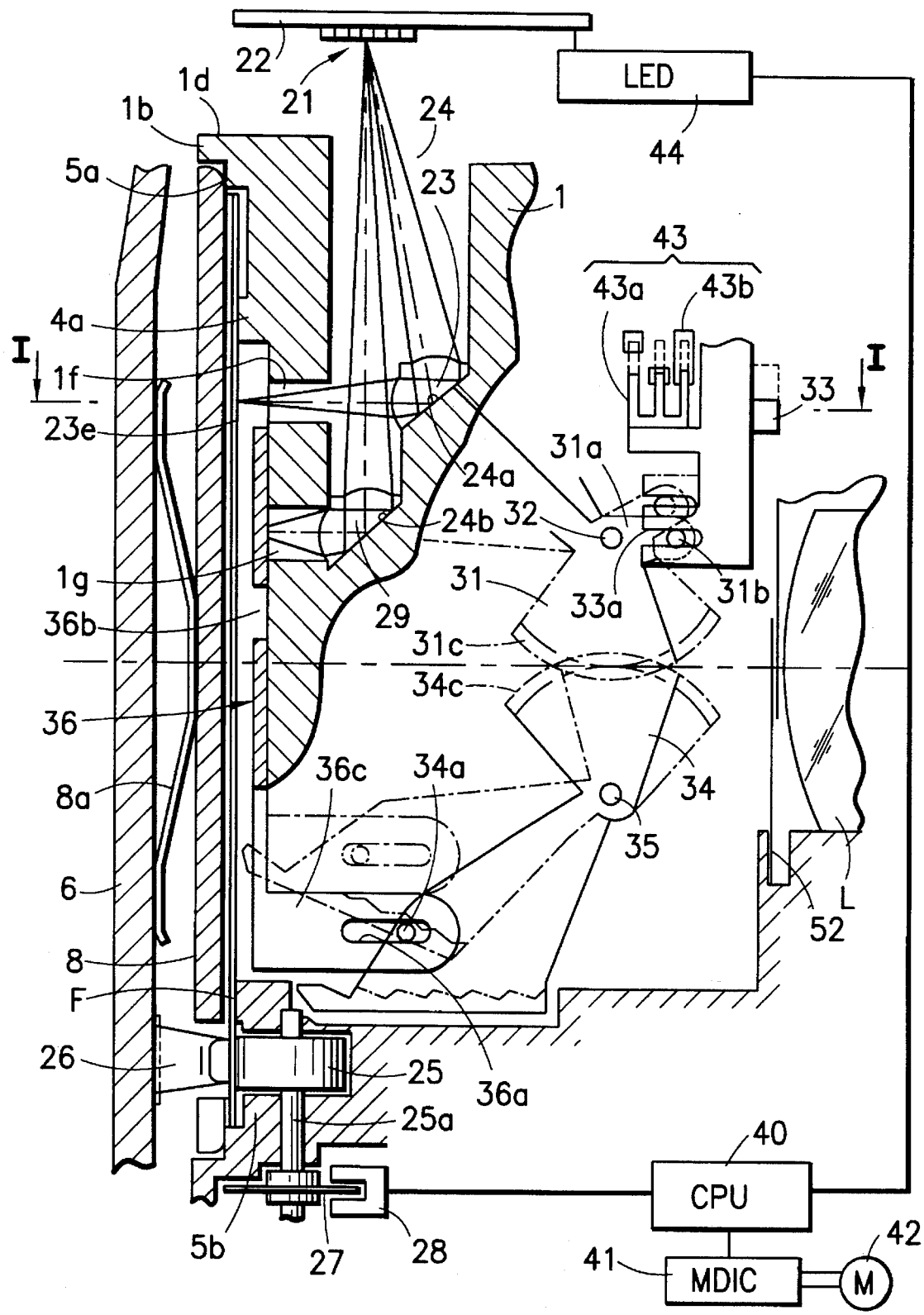
FIG. 3 is a transverse cross section of the camera of FIG. 1, as viewed from the side, depicting an optical system and a cutaway view of a framing mechanism operating in a full size mode position with double dashed outlines illustrating a panorama size mode position.

Referring to FIG. 3, a mechanism for the operation of shutter plate 36 includes an upper screen framing member 31 attached to shafts 32, 32. Shafts 32, 32, pass rotatably through partitioning walls 1a and 1k, as shown in FIG. 1, allowing upper screen framing member 31 to rotate through an angle. A screen frame actuator 33 has a slot engaging a pin 31b on an ear portion 31a of upper screen framing member 31. An external control (not shown) is used to displace screen frame actuator 33 from a full size frame position to a panorama size frame position, shown by a double dash outline in FIG. 3, thereby rotating upper screen framing member 31 from a full size frame position, shown by the solid outline, to a panorama size frame position, shown by the double dash outline. In the full size frame position, upper screen framing member 31 has a cropping portion 31', shown in FIG. 1, which is raised thereby permitting exposure of an upper portion of film F. In the panorama size format position, cropping portion 31' is lowered thereby masking the upper portion of film F.

A lower screen framing member 34 is similarly mounted upon shafts 35, 35, which pass rotatably through walls 1a and 1k, as shown in FIG. 1. Lower screen framing member 34 has a geared portion 34c engaged with a geared portion 31c of upper screen framing member 31 such that motion of lower screen framing member 34 mirrors that of upper screen framing member 31, thereby cropping the lower portion of film F with a cropping portion 34' shown in FIG. 1.

The shutter plate 36 has an ear portion 36c with a slot 36a therein. A boss 34a, of lower framing member 34, engages slot 36a. Shutter plate 36 is slidably mounted such that it is actuated along a vertical axis in accordance with a position of lower framing member 34. Shutter plate 36 is shown in the full size position, covering aperture 1g while aperture 1f is uncovered. Alternative methods of implementing a shutter mechanism would be recognized in view of this disclosure by those skilled in the art. For example, pivoting shutters and rod-type linkages may be employed. Such methods, while employing alternative actuating systems, remain within the scope and spirit of the present invention.

An optical system comprises an optical system shaft 24 which has an upper taper 24a and a lower taper 24b supporting prisms 23 and 29, respectively. Upper taper 24a is set back further from the surface of film F than lower taper 24b thereby permitting emitted light from light emitting elements 21 to reach both lower taper 24b and upper taper 24a. Prisms 23 and 29 both have reflecting surfaces on planes of upper and lower tapers, 24a and 24b, respectively, for reflecting the emitted light onto the surface of film F. Reflected emitted light of prism 23 crosses a path of incident emitted light of prism 29. The crossing of light paths permits both prisms, 23 and 29, and their respective apertures, 1f and 1g, to be in a line in a plane perpendicular to film F, thus allowing the optical system shaft width to be narrow along an axis perpendicular to the plane of FIG. 3.

A roller 25 contacts an inner surface of film F and a spring 26, aligned with roller 25, contacts an outer surface of film F biasing film F against roller 25. Friction between roller 25 and the surface of film F rotates roller 25 in step with the movement of film F. Roller 25 is coupled to a slit wheel 27 by a shaft 25a. A conventional photo interrupter 28 encircles the edge of slit wheel 27. Photo interrupter 28 includes a light source in one of its arms and a photo detector in another of its arms. Each time a slit in slit wheel 27 passes between the light source and the photo detector, the photo detector produces a pulse signal which indicates a length of film F passing roller 25. It would be realized by one skilled in the art that alternative means of tracking film advance exist such as magnetic hall effect devices and variable resistance devices. Use of such devices is within the scope and spirit of the present invention.

The pulse signal from photo interrupter 28 is applied as a feedback signal to a controller 40. Controller 40 comprises a CPU, ROM, RAM and peripherals for controlling a motor driver 41 for driving a film advance drive motor 42. An exposure format detecting switch 43 is controlled by a position of screen frame actuator 33 and signals to controller 40 a selected exposure format. The exposure format detecting switch has a brush 43a, positioned by screen frame actuator 33, which engages a stationary portion 43b. Signals produced by controller 40 are applied to LED driver 44. LED driver 44 produces drive signals for the LEDs of light emitting elements 21. The timing of the drive signals applied to light emitting elements 21 is controlled according to whether full size or panorama size format mode is selected. It is recognized that embodiments of the present invention may employ other means for implementing the controller without departing from the scope and spirit of the present invention.

Contact between brush 43a and stationary portion 43b produces an electrical signal which indicates to controller 40 that the panorama size format is selected. When the panorama size format is selected, controller 40 actuates LED driver circuit 44 such that positioning and timing of the imprinting of data produces imprinted data in the panorama format. Conversely, when brush 43a and stationary portion 43b are out of contact, controller 40 initiates imprinting corresponding to that required in full size mode.

Figure 4:
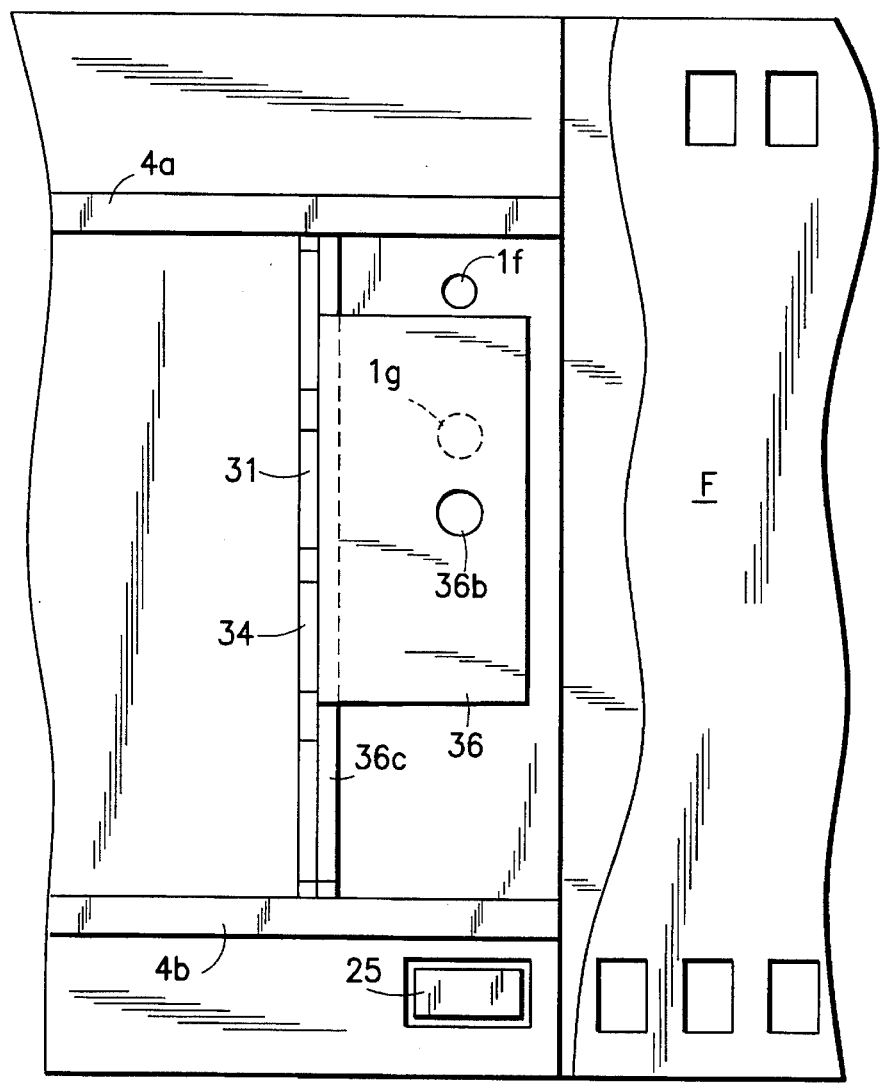
FIG. 4 is a rear view of the camera body of the first embodiment of the present invention, shown in FIG. 1, illustrating a shutter plate and the framing mechanism in full size format positions.

Referring to FIG. 4, a backside view of the camera shows shutter plate 36 positioned in the full size format position with aperture 1f open and aperture 1g occluded. Upper and lower screen framing members, 31 and 34, are adjacent to shutter plate 36 and its ear portion 36c. Roller 25 is shown disposed below inner rail 4b and shutter plate 36. Film F, shown cut-away to the right, is aligned so as to pass over roller 25 which signals to controller 40 the amount of film passing. When the panorama size format is selected, shutter plate 36 rises upward and aperture 36b is aligned with aperture 1g. Thus, reflected light passing through either one of aperture 1f and aperture 1g is used to imprint data upon film F as it travels. The travel of film F, as sensed by roller 25, is used to coordinate a sequentially implemented longitudinal imprinting pattern upon film F. A vertical imprinting pattern is determined by a selection of LEDs of light emitting elements 21, as depicted in FIG. 3, which are simultaneously illuminated. Alternative embodiments of the present invention may employ differing light emitting devices or light controlling devices without departing from the scope and spirit of the present invention.

Figure 5:
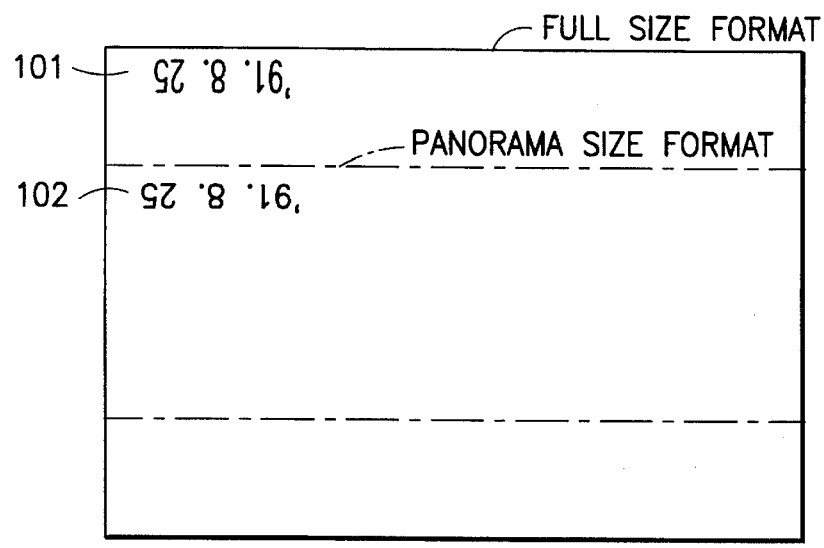
FIG. 5 is a view of a film imprinted upon by the present invention showing a panorama size format overlaid upon a full size format.

Referring to FIG. 5, format layouts are shown with the panorama size format cropping shown in double dash lines superimposed upon the full size format cropping. Imprinted data 101 is in a position used in the full size format and imprinted data 102 is in a position used in the panorama sized format. The vertical positioning of imprinted data, 101 and 102, is determined by the positioning of apertures 1f and 1g, respectively. Imprinted data 102 of the panorama size format is accordingly located inward from imprinted data 101 of the full size format. A pattern of imprinted data, 101 and 102, as noted above, is produced by selective sequential illumination of the LEDs of light emitting elements 21 in coordination with the travel of film F past apertures 1f and 1g. Imprinted data, 101 and 102, of the figure may represent, for example, the date of the exposure. It is recognized that various other types of information and data may be imprinted upon the exposure. As examples and not limitations, such data may include an f-stop setting, a shutter speed setting, light levels, and photo identifiers or titles. It is further recognized that embodiments of the present invention may include peripherals that interface with the camera to allow data to be entered for imprinting purposes.

Figure 6:
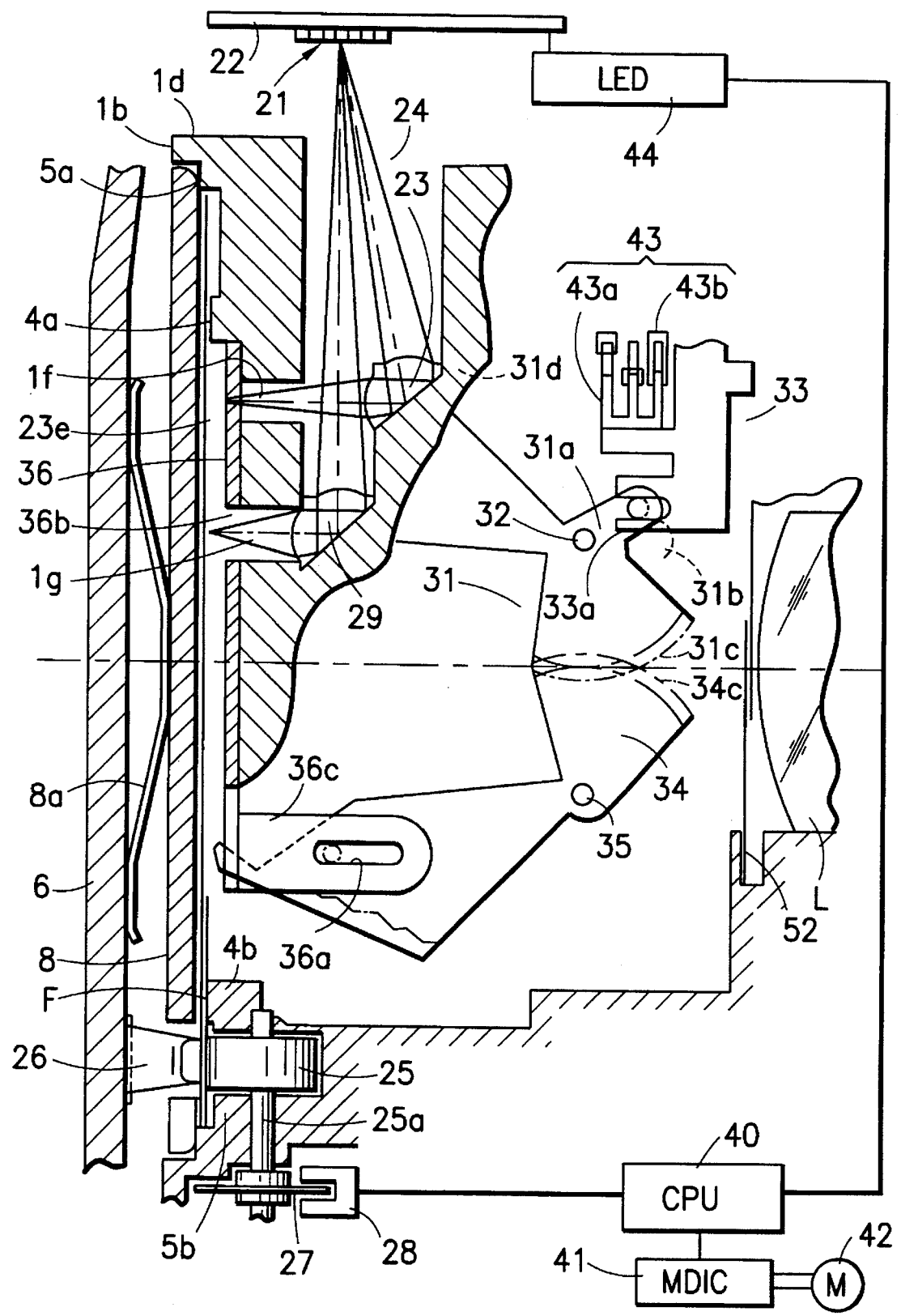
FIG. 6 is a transverse cross section of the camera of FIG. 1, as viewed from the side, depicting the optical system and a cutaway view of the framing mechanism operating in a panorama size mode.

Referring to FIG. 6, the optical system and the mechanism for the operation of the shutter plate 36 is shown in the panorama size format mode. The incident emitted light of prism 29 crosses the path of the reflected emitted light of prism 23 and is reflected by prism 29 upon the surface of film F. Aperture 36b, of shutter plate 36, is place in alignment with aperture 1g of the optical system, permitting the emitted light to strike film F at a lower position than in the full size framing position, wherein the reflected emitted light passes through aperture 1f. Shutter plate 36 covers aperture 1f of the optical system thereby disabling full size format data imprinting.

Referring to FIG. 7, the alignment of shutter plate aperture 36b with the optical system aperture 1g is shown from the rear side perspective. Cropping portions, 31' and 34', of upper and lower framing members, 31 and 34, respectively, are shown in their panorama mode positions, and aperture 1f is covered by shutter plate 36 thus disabling the imprinting of data in the full size format.

Referring to FIGS. 8(a) and 8(b), the optical relationships of prisms 23 and 29 are shown wherein a size of the imprinted data is varied from the full size format to the panorama size format. While prisms 23 and 29 in prior figures have a reflecting surface, biconvex lenses, and are triangular in shape, prisms 23 and 29 are represented in FIG. 8 as simple biconvex lenses in the interest of simplicity. An arrow Y0 at the left of FIGS. 8(a) and 8(b) represents an object height of light emitting elements 21 while arrows, Y1 and Y2, on the right side represent image heights of the resultant imprinted data. While object height Y0 is constant in both figures 8(a) and 8(b), image height Y1 of the full size format imprinted data is larger than image height Y2 of the panorama size format imprinted data, shown in FIG. 8(a). The ratio of object and image distances, $S_1$ to $S_1'$, is determined by a position of prism 23 in optical shaft 24 with respect to light emitting elements 21 and the surface of film F. The focal length f of the lens may then be selected to produce a focused image based upon this ratio. Similarly, the ratio of object and image distances, $S_2$ to $S_2'$ is determined. It is realized that alternative embodiments of the present invention may employ other light directing and focusing means, such as mirrored surfaces and independent lenses, in place of the compound lens-prism of the presented embodiment, without departing from the scope and spirit of the present invention.

The embodiment of the present invention, as described above, has prism 23 in a line with prism 29 in a vertical plane perpendicular to the surface of film F and set back further from film F than prism 29, as shown in FIG. 6. This arrangement results in image distance $S_1'$ being greater than image distance $S_2'$ and the crossing of paths of the reflected emitted light of prism 23 and the incident emitted light of prism 29. Furthermore, the selection of the distances $S_1$, $S_2$, $S_1'$, and $S_2'$ permits the use of a single type of prism having the same focal length f for both prisms 23 and 29. Finally, the crossing paths of light permits the in-line arrangement thus reducing the width of the space required for the optical system allowing a more compact camera to be produced.

Figure 9:
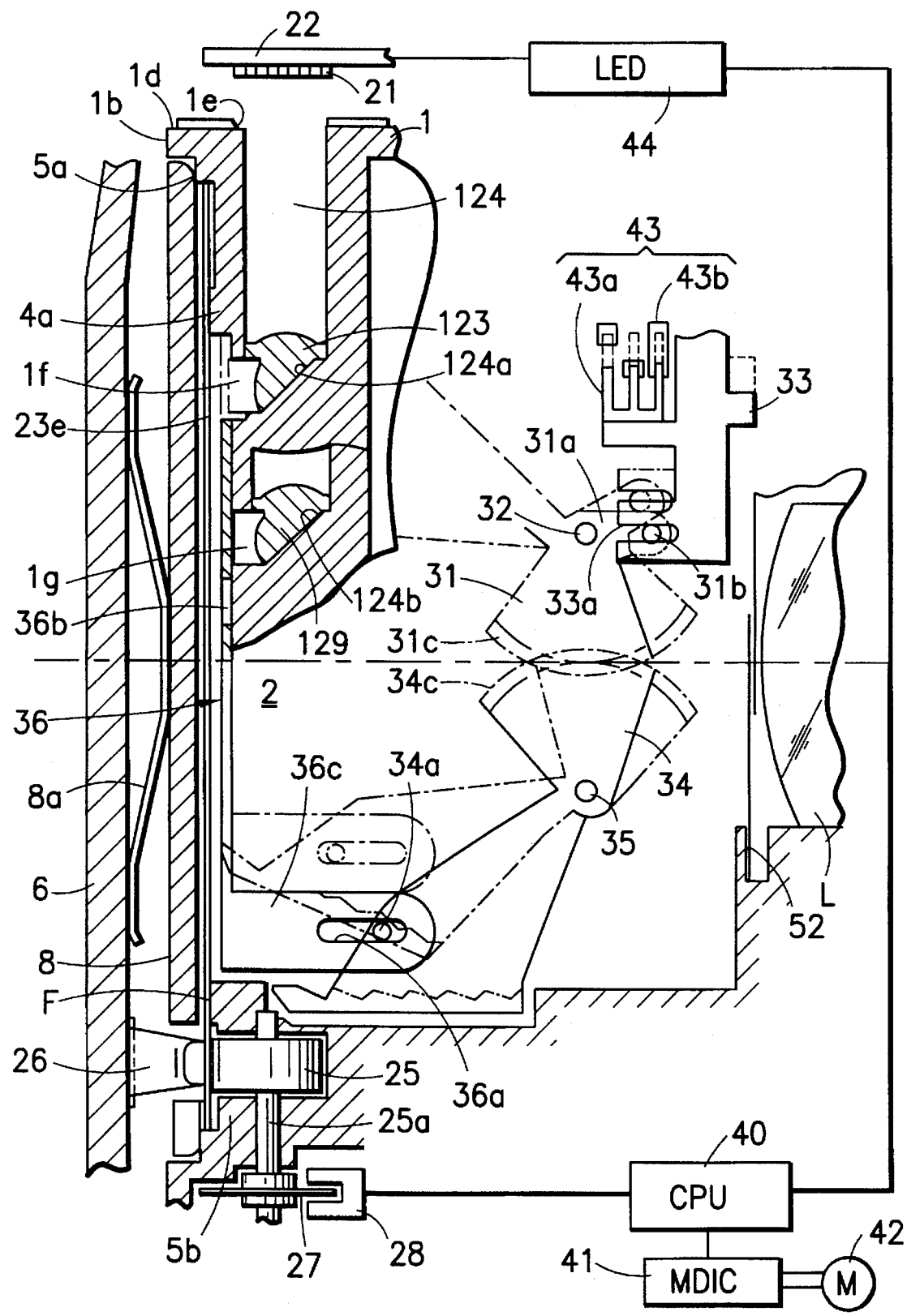
FIG. 9 is a transverse cross section of a camera of a second embodiment of the present invention, as viewed from the side, depicting an optical system and a cutaway view of a framing mechanism operating in a full size mode position with double dashed outlines illustrating a panorama size mode position.
Figure 10:
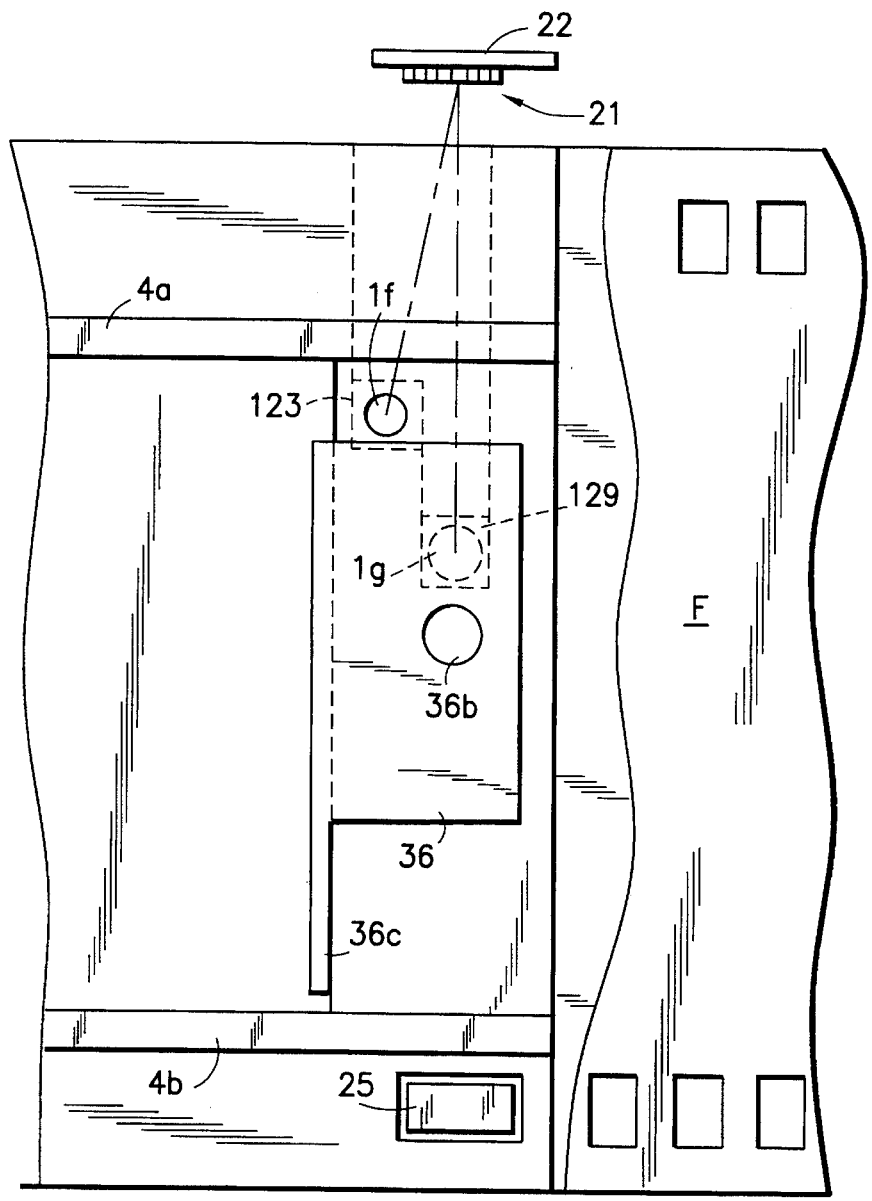
FIG. 10 is a rear view of the camera body of the second embodiment of the present invention, shown in FIG. 9, illustrating positions the shutter plate and the framing mechanism in the full size format position and light paths of the optical system.

Referring to FIGS. 9 and 10, a second embodiment of the present invention is shown having features similar to those of the first embodiment, described above, except as note herein. An optical system shaft 124 has upper and lower tapers, 124a and 124b, upon which are mounted prisms 123 and 129, respectively. Prisms, 124a and 124b, are located a substantially equal distance from the surface of film F and are thus in a line with each other in a plane parallel with film F. In FIG. 10, it is clear that prisms, 123 and 129, are offset from each other. This offset arrangement produces an optical system requiring less depth in camera body 1 than the first embodiment of the present invention since there is no crossing of light paths.

Figure 11A:
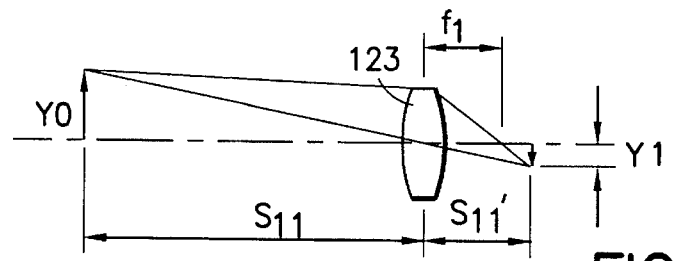
FIGS. 11a and 11b are schematic diagrams showing the optical paths in the second embodiment of the present invention in full size and panorama size modes, respectively.
Figure 11B:
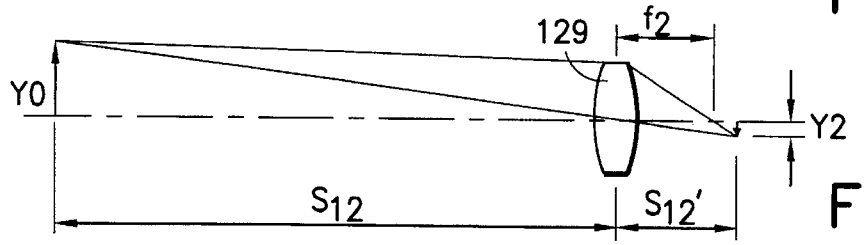
Figure 12:
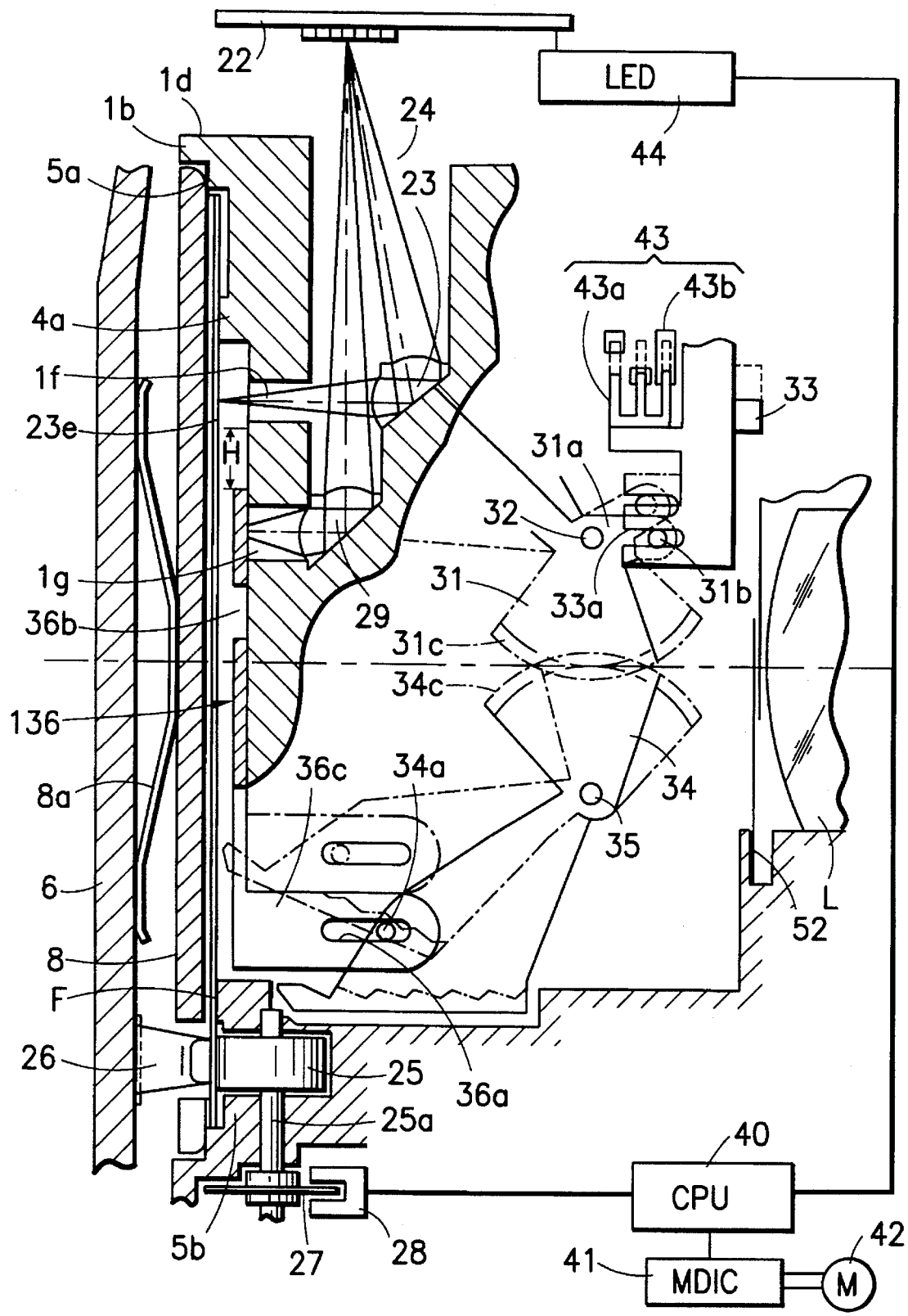
FIG. 12 is a transverse cross section of a camera of a third embodiment of the present invention, as viewed from the side, depicting an optical system and a shutter plate configuration.
Figure 13:
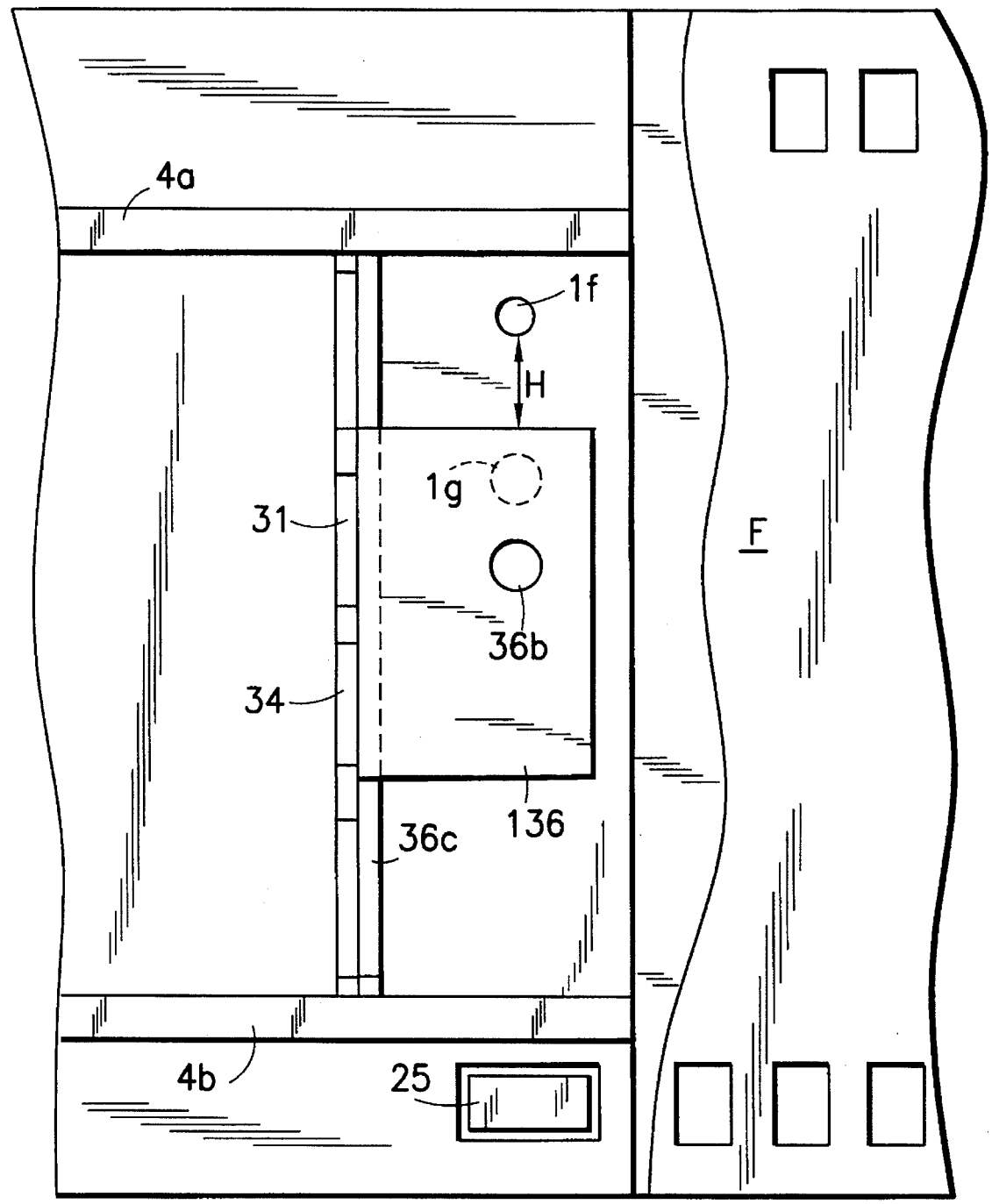
FIG. 13 is a rear view of the camera body of the third embodiment of the present invention, shown in FIG. 12, illustrating the shutter plate and the framing mechanism in the full size format position.
Figure 14:
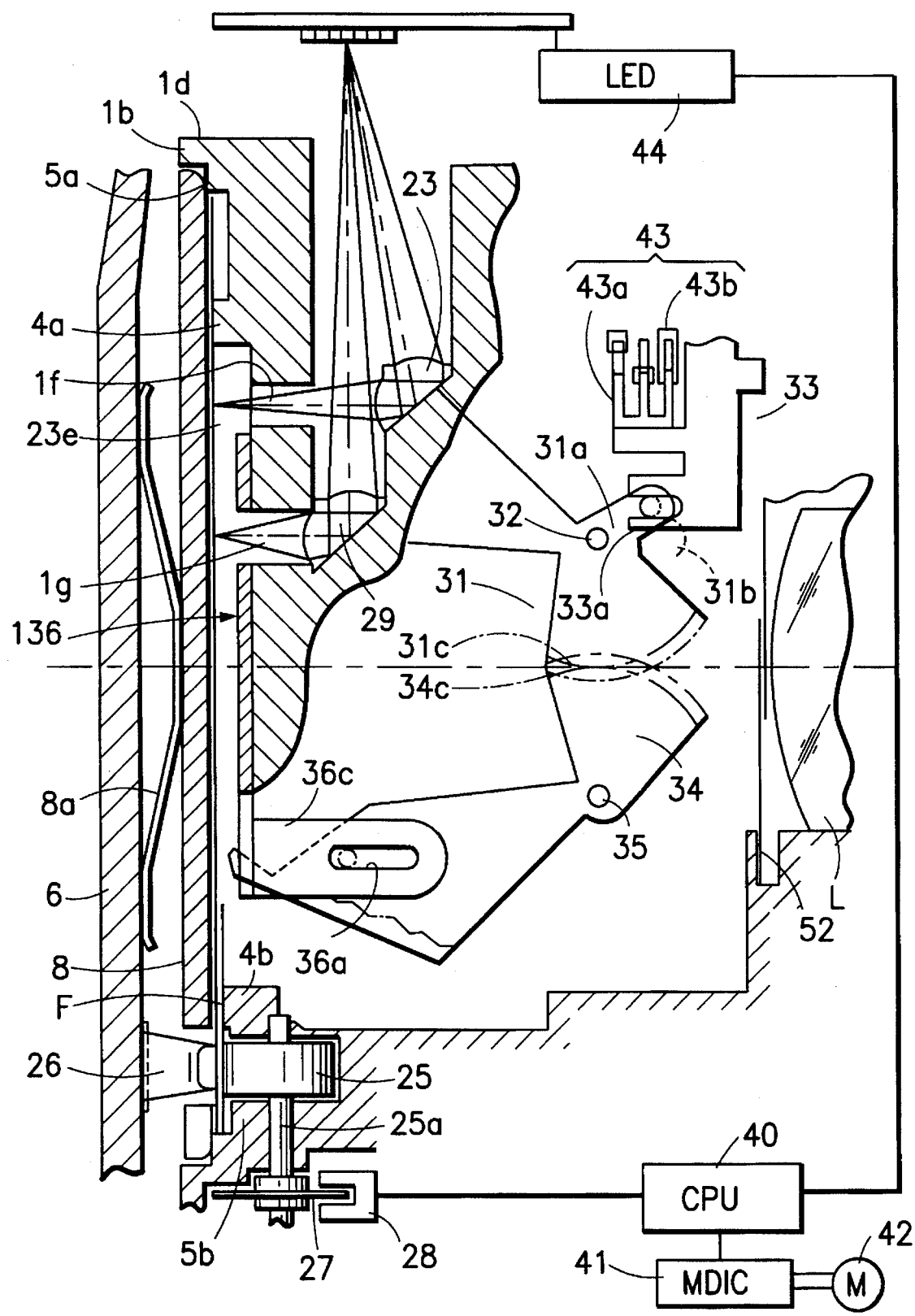
FIG. 14 is a transverse cross section of the third embodiment of the present invention, as viewed from the side, depicting the optical system and a cutaway view of the framing mechanism operating in the panorama size mode.
Figure 15:
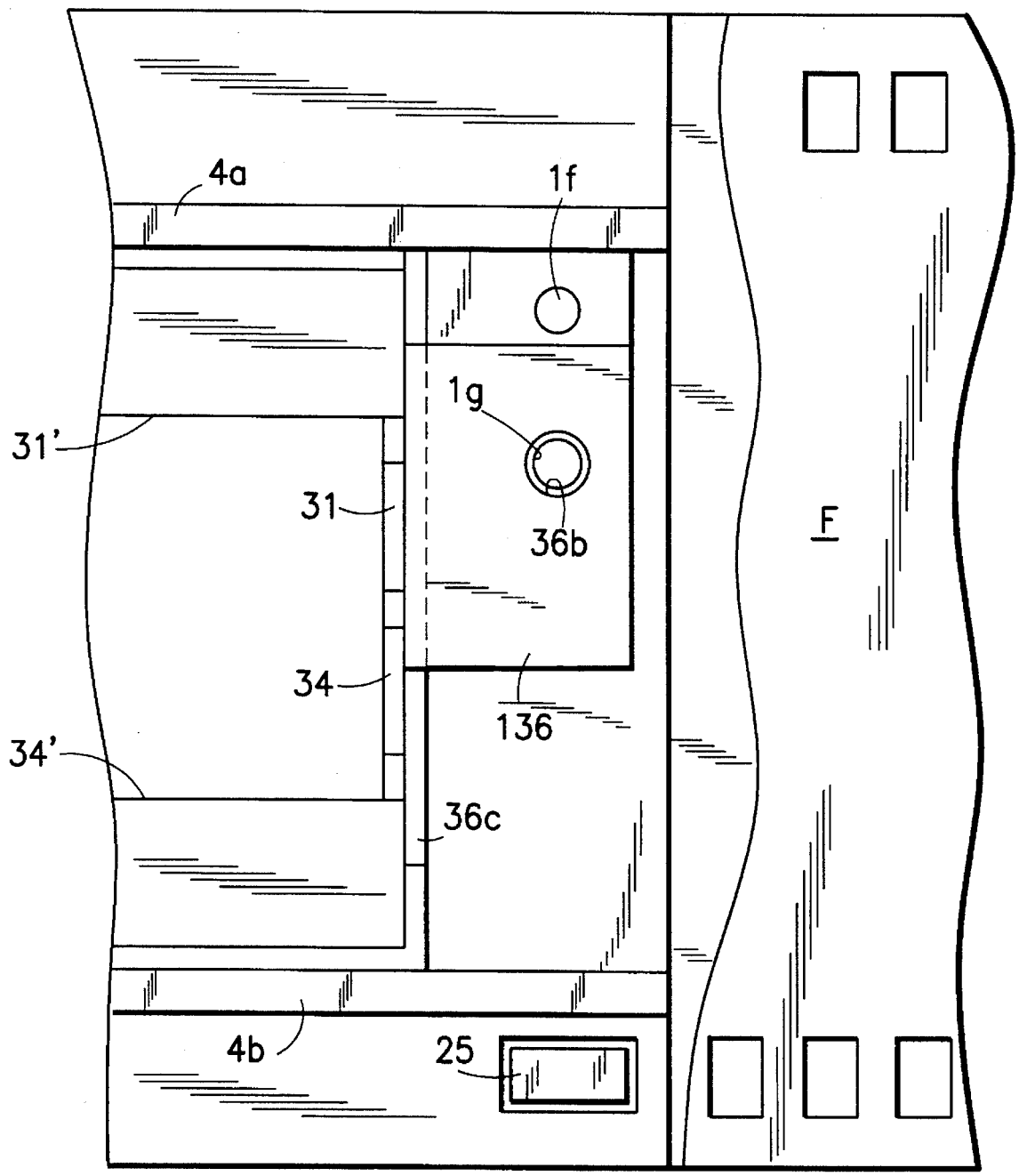
FIG. 15 is a rear view of the camera body of the third embodiment of the present invention illustrating positions of the shutter plate and the framing mechanism in the panorama size mode.

Referring to FIG. 11, wherein optical path lengths of the second embodiment of the present invention include image distances $S_{11}'$ and $S_{12}'$, representing distances from film F to prisms 123 and 129 respectively, being substantially equal. Object distances $S_{11}$ and $S_{12}$ represent distances from light emitting elements 21 to prisms 123 and 129 which are represented as simple biconvex lenses for purposes of simplicity. Object distance $S_{11}$ is shorter than object distance $S_{12}$. Accordingly, image height Y1 produced in the full size format is greater than image height Y2 produced in the panorama size format. Focal lengths $f_1$ and $f_2$ of prisms 123 and 129 are either selected independently in order to focus images Y1 and Y2, or are equal provided that there is a sufficient depth of field for images to be adequately focused. It is recognized by those skilled in the art that various combinations of focal lengths and object and image distances may be chosen based upon requirements of a system.

Referring to FIGS. 12 through 15, there is shown a third embodiment of the present invention which is similar to the first embodiment except as noted herein. A shading plate 136 is shown in a full size format position in FIGS. 12 and 13 wherein an upper portion of shading plate 136 covers aperture 1g and ends a distance H from aperture 1f. Shading plate 136 is in the panorama format position in FIGS. 14 and 15 with aperture 36b aligned with aperture 1g thereby permitting data imprinting in a panorama size format. Aperture 1f remains uncovered thus permitting simultaneous full size format data to be imprinted, however, the full size format data does not affect a photographed image because the full size format imprinting is on an area of film F which is masked by upper cropping portion 31' of upper framing member 31.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A data imprinting device for use in a camera comprising:

a light source for emitting imprinting light;

a first part of said device for focusing said imprinting light upon a photosensitive surface at at least two positions;

a second part of said device for selectively occluding said imprinting light from focusing upon at least one position of said at least two positions;

said first part including a first reflecting unit for reflecting incident light of said imprinting light upon a first position of said at least two positions;

said first part including a second reflecting unit for reflecting incident light of said imprinting light upon a second position of said at least two positions;

said first position being further from a center of said photosensitive surface than said second position;

said first reflecting unit being set back further from said photosensitive surface than said second reflecting unit;

said first and second reflecting units including first and second prisms respectively, each having a lens incorporated therein;

a camera body having a first aperture;

said first aperture permitting reflected imprinting light, of said first reflecting unit, to strike said photosensitive surface;

the camera body having a second aperture;

said second aperture permitting reflected imprinting light, of said second reflecting unit, to strike said photosensitive surface; and said second part including a portion for covering at least one of said first and second apertures.

\* \* \* \* \*